Sept. 7, 1954  H. V. G. STUBBS  2,688,581
METHOD FOR APPLYING METAL FOIL TO PLASTIC MATERIAL
Filed Sept. 18, 1952

Inventor:-
Harold Vivian George Stubbs
By:- William E. T. Bayly
Attorney.

Patented Sept. 7, 1954

2,688,581

UNITED STATES PATENT OFFICE 2,688,581

METHOD FOR APPLYING METAL FOIL TO PLASTIC MATERIAL

Harold Vivian George Stubbs, Upton, England, assignor to The Plessey Company Limited, Ilford, England, a British company Application September 18, 1952, Serial No. 310,199

3 Claims. (Cl. 154—102)

This invention relates to a method and means for applying metal foil to plastic sheet material.

An object of the invention is to provide a combined sheet strip or the like, which may be readily produced and handled.

Another object of the invention is to provide a metal foil with a number of holes in which one surface is roughened or jagged by the formation of these holes, said roughened surface of the foil is placed face to face with a film of plastic material and then subjected to pressure, or both pressure and heat, when the plastic film is rendered sufficiently softened to penetrate through the holes in the foil to form small flat heads flush with the outer surface of the metal foil. The term plastic material or film is intended to cover any thermo-plastic material which at normal temperature and pressure can be extruded or softened under pressure and/or heat, for example, polyvinyl chloride. The preferred material is rubber or rubber-like material.

Preferably the holes in the foil are embossed so as to improve the keying of the film to the foil.

The invention will now be described with reference to the accompanying drawings in which.

Figure 1:
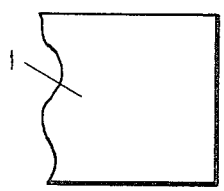
Fig. 1 is a plan of metal foil.
Figure 2:
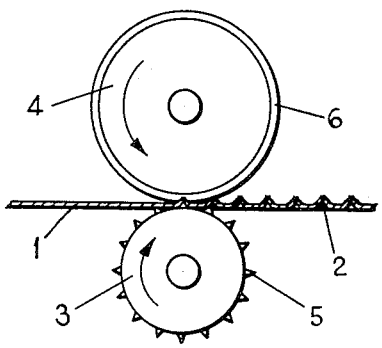
Fig. 2 shows one way of perforating the foil.
Figure 3:
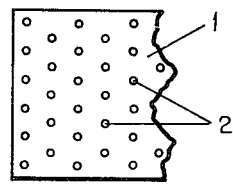
Fig. 3 is a plan of the perforated foil.
Figure 4:
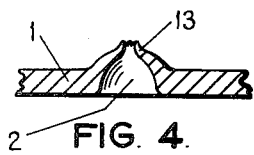
Fig. 4 is an enlarged detail showing a perforated aperture in relief.

Referring to Figs. 1 to 7 inclusive:

A metal foil 1 of about .002 inch in thickness is perforated with small embossed holes 2 (Fig. 3) of about twenty to the square inch. The formation of these holes may be carried out by passing the foil 1 between a pair of rollers, 3, 4 in which one roller 3 is provided with a series of dome shaped piercing elements 5 (Fig. 2) and the other roller 4 is lined with a rubberised material 6 for receiving the ends of the piercing elements 5 as the foil is fed through the rollers 3, 4 whereby a series of approximately dome shaped holes 2 are pierced which stand out in relief on one surface of the foil as shown in Fig. 4.

Figures 5, 6, 7:
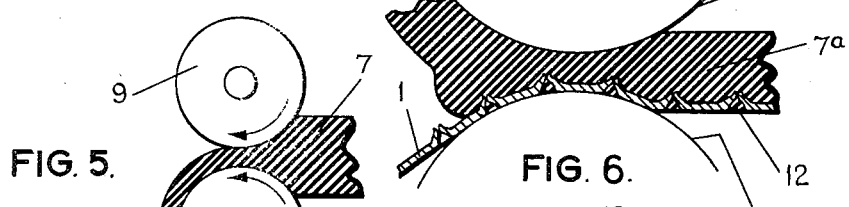
Fig. 5 shows one method of securing the foil to a plastic material.
Fig. 6 is an enlarged detail of Fig. 5.
Fig. 7 is a plan of the metal backing.
Figures 8, 9:
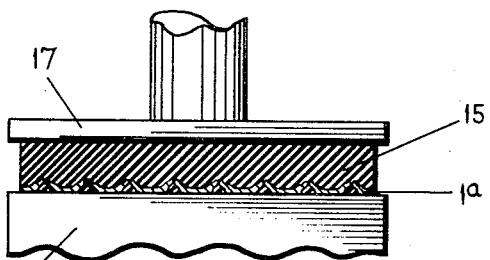
Fig. 8 is an enlarged detail of an extruded rubber head.
Fig. 9 is a view of a modification for securing the metal backing to the plastic material.

In the present example the foil is intended to be secured to an uncured rubber 7 which may be carried out by having the pierced metal foil 1 wound on a reel 8 so that when the uncured rubber is calendered between rollers 9, 10, 11 to form a thin rubber sheet 7ª in a known manner, the pierced metal foil 1 is fed with the embossed side or surface in relief, in face to face contact with the rubber 7 between the rollers 10, 11, the pressure resulting therefrom extrudes the rubber through the holes in the form of an enlarged head 12 (Figs. 6 and 7) and the jagged ends 13 of the hole 2 in the foil 1 is embedded in the rubber sheet 7ª by a short narrow neck 14 as indicated in Figs. 6 and 7, thereby providing a metal backing to a sheet of plastic material in which the rubber heads 12 are flush with the foil 1 as shown in Figs. 7 and 8.

Alternatively, the metal backing may be secured to a plastic material, for example rubber, by placing an uncured rubber film 15 (Fig. 9) face to face with the roughened surface of the pierced foil 1ª, then placing them on a platen 16, and the rubber is then cured, by the aid of a press 17 (Fig. 9) applying a pressure of about 80 lbs. per square foot at a temperature of 120 to 150° C., the time depending upon the accelerator used, when the rubber is extruded through the apertures in the foil as hereinbefore described with reference to Figs. 1 to 9.

I claim:

1. A method of applying a metal backing to a plastic material comprising the steps of taking a sheet of metal foil having embossed apertures with a narrow neck on one surface, placing the embossed surface thereof face to face with a strip of plastic material then applying pressure until said plastic material has extruded through the narrow neck flush with the outer surface of the metal foil.

2. A method of securing a metal backing to plastic material comprising the step of taking a strip of metal foil which is formed with a plurality of dome-shaped apertures terminating with a narrow neck on one surface, placing the embossed side thereof face to face with a plastic strip then compressing at a pressure and temperature until the surface of the plastic material has softened and penetrated flush with the outer surface of the metal foil.

3. A method of applying a metal backing to plastic material comprising the steps of calendering an uncured rubber to reduce it into a thin sheet, feeding a metal foil with dome-shaped perforations on one surface thereof being fed into contact with the rubber sheet as it passes between the final calendering rollers, causing the rubber to extrude and penetrate the apertures in the form of a narrow neck with an enlarged head flush with the surface of the metal foil.

References Cited in the file of this patent

UNITED STATES PATENTS

| Number | Name | Date |
|---|---|---|
| 1,433,971 | Roberts | Oct. 31, 1922 |
| 2,003,494 | Reynolds | June 4, 1935 |
| 2,071,921 | Dickson | Feb. 23, 1937 |
| 2,165,818 | Scholl | July 11, 1939 |
| 2,205,466 | Caprio et al. | June 25, 1940 |
| 2,220,460 | Scholl et al. | May 5, 1940 |